(12) United States Patent
Kim et al.

(10) Patent No.: US 7,684,667 B2
(45) Date of Patent: Mar. 23, 2010

(54) HYBRID INTEGRATED STRUCTURE OF ONE OR MORE OPTICAL ACTIVE DEVICES AND PLC DEVICE USING OPTICAL FIBER ARRAY

(75) Inventors: Dug Bong Kim, Gwangju-si (KR); Hyung Myung Moon, Gwangju-si (KR); Chan Yong Park, Gwangju-si (KR); Jin Bong Kim, Gwangju-si (KR)

(73) Assignees: Photonic Solution, Inc., Gwangju-si (KR); PPI Technology Inc., Gwangju-si (KR)

( * ) Notice: Subject to any disclaimer, the term of this patent is extended or adjusted under 35 U.S.C. 154(b) by 0 days.

(21) Appl. No.: 12/175,649

(22) Filed: Jul. 18, 2008

(65) Prior Publication Data

US 2009/0067778 A1 Mar. 12, 2009

(51) Int. Cl.
*G02B 6/30* (2006.01)
(52) U.S. Cl. .............................. 385/49; 385/47; 385/65; 385/83
(58) Field of Classification Search .................... 385/49, 385/65, 83
See application file for complete search history.

(56) References Cited

U.S. PATENT DOCUMENTS

| 7,024,079 | B2 * | 4/2006 | Komiya et al. ................. 385/49 |
| 2003/0044119 | A1 * | 3/2003 | Sasaki et al. ................... 385/49 |
| 2004/0042728 | A1 * | 3/2004 | Ito et al. ........................ 385/49 |

* cited by examiner

*Primary Examiner*—Charlie Peng
(74) *Attorney, Agent, or Firm*—Drinker Biddle & Reath LLP

(57) ABSTRACT

A hybrid integrated structure of an optical active device and a Planar Lightwave Circuit (PLC) device using an optical fiber array is provided, in which one or more photodiodes are integrated on an upper cladding layer above one or more planar optical waveguides. A section located on a boundary surface between output optical waveguides, that is, an end of the PLC device in the direction of propagation of light, and the input end of an output optical fiber array is ground to be inclined at a predetermined angle with respect to an optical axis. Further, one or more optical fibers and one or more reflection mirrors are alternately arranged, inserted, and disposed in a plurality of V-shaped trenches formed in the output optical fiber array.

18 Claims, 10 Drawing Sheets

US 7,684,667 B2

HYBRID INTEGRATED STRUCTURE OF ONE OR MORE OPTICAL ACTIVE DEVICES AND PLC DEVICE USING OPTICAL FIBER ARRAY

BACKGROUND

The present invention relates generally to a structure in which one or more planar optical waveguides are coupled to one or more photodiodes, each of which is an optical active device, in order to convert one or more optical signals flowing along optical paths, which configure an end of a Planar Lightwave Circuit (PLC) device, into electric signals.

Here, the planar light wave circuit device means an optical device for enabling one or more optical signals to flow through optical paths formed on a planar surface by implementing a structure the same as optical fibers, which transmit light without loss, and for performing functions of multiplexing the optical signals having various wavelengths, demultiplexing the multiplexed optical signals into optical signals each having separate wavelength, attenuating the power of the optical signals, splitting optical power, and switching optical paths.

An Arrayed Waveguide Grating (AWG) device is an example of a representative planar light wave circuit device used to multiplex optical signals having various wavelengths and to demultiplex the multiplexed optical signals into optical signals each having a separate wavelength in an optical communication field.

Generally, an AWG device, which is a PLC device, performs a demultiplexing function of outputting a plurality of multiplexed optical signals having various wavelengths, input through a single input optical waveguide, through a plurality of output optical waveguides, and performs a multiplexing function of outputting a plurality of signals having various wavelengths, which are input through a plurality of input optical waveguides, through a single output optical waveguide.

A device, which adjusts the optical signals, is called an optical passive device, and is formed of silica medium, the refractive indexes of which are different from each other, on a silicon substrate. The AWG device is generally manufactured through a process of layering a cladding layer and a core layer on a substrate, performing etching on the core layer through a lithography process and a dry etching process and forming an optical path, through which an optical signal flows, along the core patterned in various forms, and layering the cladding layer again on the substrate on which the patterned core is formed. The planar optical waveguide which configures the tap coupler of FIG. 5 is manufactured using the above-described process.

When an optical-sub-system for processing optical signals by integrating PLC devices, such as the AWG device, a multi-port Variable Optical Attenuator (VOA) and an optical power splitter, is configured, it is preferred that the power of optical signals, input to/output from the respective input ports/output ports of each of the PLC devices, each having a plurality of input ports and a plurality of output ports, be monitored and then be uniformly adjusted.

Here, in order to monitor the optical signals of the respective input/output ports, it is required to install one or more tap couplers on one or more input/output optical waveguides, connected to the one or more input/output ports, to branch one or more optical signals into one or more optical waveguides, which are manufactured using the tap couplers, and to monitor the power of the branched optical signals using one or more photodiodes, which are optical active devices.

Such a photodiode, used in this case, is a representative optical active device and performs a function of switching an optical signal into an electric signal. A razor diode which performs a function of switching an electric signal into an optical signal may be another example of the optical active device. In order to handle optical signals having wavelengths in the range of 1310-1550 nm, which is mainly used in optical communication, using a photoelectric effect or an electro-optic effect, a p-n junction layer is formed by layering InGaAs materials, the generation rates of which differ from each other, on an InP substrate, thereby manufacturing an optical active device capable of switching an optical signal into an electric signal or switching an electric signal into an optical signal.

When an optical active device is coupled to an optical passive device for use, the optical passive device and the optical active device are formed of different materials, and thus the optical passive device and the optical active device cannot be manufactured on a single substrate using the same process. Therefore, the respective devices, which are completed using their respective processes, should be aligned and then attached. The operation of coupling an optical active device and an optical passive device, which are made of different materials and then integrated, is called hybrid integration.

Prior art hybrid integrated technology discloses a method of carving one or more trenches, each of which is narrow and inclined, so as to cut one or more planar optical waveguides which configure a PLC device, inserting one or more reflection filters so as to reflect optical signals, which flow through the planar optical waveguides, outside the cores of the respective planar optical waveguides, and then enabling the optical signals to be incident on the light receiving regions of one or more photodiodes. In this case, in order to attach one or more optical active devices to one or more optical passive devices, silicon platforms are formed on the substrates of the respective optical passive devices, one or more planar optical waveguides and the optical active regions of the respective optical active devices are accurately aligned, and then packaging is performed through flip chip bonding. FIGS. 1 and 2 are views showing a structure to which a PLC device 40 and a photodiode device 50, which is an optical active device, are coupled according to the prior art.

First, a PLC device module that can be actually used in a worksite is configured to include an input optical fiber array, to which an optical connector, that is, an incidence port, is attached, an output optical fiber array, to which an optical connector, that is an emission port, is attached, and a PLC device interposed therebetween and configured to adjust optical signals (demultiplex optical signals, multiplex optical signals, and mediate optical power). Furthermore, in order to switch an optical signal flowing through a planar optical waveguide into an electric signal, the PLC device module should further include a photodiode, which is an optical active device, and an electric circuit for connecting the photodiode. Here, the photodiode is a device for outputting current or voltage, which is an electric signal proportional to received optical power.

In this case, a prior art structure is configured such that a trench 35, having a predetermined angle inclined in a depth direction, is carved in one end of an output optical waveguide so as to cut the core 12 of a planar optical waveguide, a reflection mirror 11 having predetermined reflectance is inserted therein, an optical signal flowing through the core 12 of the planar optical waveguide is reflected at a predetermined angle, and reflected light 17 is received by the light reception region 51 of a photodiode placed on the end of the path of the reflected light. Here, if the reflectance of the reflection mirror 11, having predetermined reflectance, is adjusted, some or all of the light can be received by the photodiode 50.

Further, the cut surface of the trench 35 formed on an end of the output optical waveguide should be very clean so as to prevent light from being dispersed, and the trench 35 should be almost as narrow as the reflection mirror 11 to be inserted, so that the thin reflection mirror 11 can be accurately placed without being tilted, thereby uniformly maintaining a reflection angle. Further, the transmittance of the reflection mirror 11 is adjusted, and the thickness thereof is less than several tens of micrometers, such that an optical signal can be transmitted to an optical waveguide connected behind the reflection mirror 11 without loss.

Further, as long as the angle of the trench 35 is accurate when the trench 35 is formed, the reflected optical signal does not deviate from the light reception region 51 of the photodiode. Therefore, it is very difficult to set the location and shape of the trench 35 and the structure and thickness of the reflection mirror 11 such that they satisfy the above characteristics, and to insert the reflection mirror 11 within the trench 35.

Furthermore, in a planar optical waveguide structure, it is very difficult to manufacture a trench which satisfies the above characteristics using an etching (wet etching or dry etching) method or a sawing method.

Further, the reflection mirror 11 that is used has a thickness of 100 μm or less, and has a multi-layered thin film structure in which thin layers (thin films) having different refractive indexes are alternately layered. Therefore, in order to obtain desired reflectance, the reflection mirror 11 must be handled such that the surface of the reflection mirror 11 is not damaged when the reflection mirror 11 is inserted, and the reflection mirror 11 must be accurately inserted into and fixed within the trench 35, such that the reflection mirror 11 has a predetermined angle within the trench 35. Accordingly, there is a problem in that errors occur in the location of the reflection mirror 11 due to the irregularity generated when the trench 35 is substantially formed and the irregularity generated when the reflection mirror 11 is inserted.

Furthermore, there are problems in that it is difficult to form a trench, which is narrow and inclined in a depth direction and to which a reflection mirror will be inserted, at an accurate location, and in that an optical signal to be reflected is not accurately incident on the light reception region of a photodiode due to a tilt phenomenon occurring when the reflection mirror is inserted into the trench and fixed using a refractive index matching epoxy.

FIGS. 3 and 4 show another prior art design disclosing a structure in which reflection and transmission are simultaneously realized by grinding one end of the output optical waveguide of a PLC device 40 to be inclined, and then using the ground surface thereof without change or inserting/attaching a multi-layered thin film filter.

That is, instead of carving a trench, which is difficult to handle, on a planar optical waveguide, a structure is configured such that an end of the output optical waveguide of a PLC device and the input end 30 of an output optical fiber array are ground to be inclined along an optical axis, a multi-layered thin film filter 11 capable of adjusting reflectance and transmittance is attached at a boundary surface between the output optical waveguide and the output optical fiber array, and part of the power of the optical signal flowing through the planar optical waveguide is reflected at a predetermined angle, so that reflected light 17 is received by the light reception region 51 of a photodiode 50 placed on an end of an optical path, and remaining power of the optical signal is output through the output optical fiber array.

In this case, since a reflection surface is formed on each of the ends of all the output optical waveguides existing in the output end of the PLC device 40 due to a multi-layered thin film filter 11, the reflection surface is applied to one or more output optical waveguides which are not desired to be monitored, thereby causing additional optical loss.

In particular, when the number of ports of the PLC device 40 increases, the area in which output optical waveguides are arranged increases. Therefore, the size of the multi-layered thin film filter 11 must increase. Further, as the size of the multi-layered thin film filter 11 increases, the thickness of the substrate for supporting the multi-layered thin film of a multi-layered thin film filter 11 increases. Therefore, as shown in FIG. 4, since the interval between the output optical waveguide and the output optical fiber array is wide, optical signals, which pass through the multi-layered thin film filter 11 and are then output through the optical fiber array, suffer additional loss.

Further, since the multi-layered thin film filter 11 is used for a part which does not require an expensive multi-layered thin film filter 11, that is, an empty part provided to maintain a predetermined interval between output optical waveguides, the cost of the multi-layered thin film filter 11 is increased.

Further, it is difficult to perform a process of uniformly attaching a multi-layered thin film filter on the output surface of the PLC device 40 or the input surface of the optical fiber array 30 without forming an air layer or flexure.

Furthermore, the air layer and flexure disturb the alignment and bonding of an output optical waveguide and an output optical fiber array, and affect the optical path, thereby causing an optical signal coupled to the optical fiber array to have additional loss.

Further, since it is difficult to manufacture a multi-layered thin film filter having the same reflectance with respect to all optical signals having various wavelengths, there is a problem in that it is difficult to apply the multi-layered thin film filter to a PLC device for handling a wide wavelength band.

SUMMARY OF THE INVENTION

Accordingly, the present invention has been made keeping in mind the above problems occurring in the prior art, and an object of the present invention is to provide a PLC device structure which does not require that one or more trenches be accurately processed in one or more planar optical waveguides and that one or more reflection mirrors, which are difficult to handle, be mounted within the respective processed trenches in order to reflect optical signals that flow through the planar optical waveguides and then receive them by respective photodiodes.

Further, another object of the present invention is to enable one or more optical signals which flow through respective planar optical waveguides to be received by one or more photodiodes using an optical fiber array and alignment process, which are essential to package a PLC device, such that an additional process of processing the planar optical waveguides and attaching one or more reflection mirrors to a boundary surface is not required to be performed.

Further, another object of the present invention is to allow a method of substituting a metal wire for an optical fiber, the metal wire having a diameter similar to that of the optical fiber and a type identical to the optical fiber, to be used with regard to a method of mounting reflection mirrors on an optical fiber array, so that a structure according to the present invention can be easily implemented in an existing process of manufacturing an optical fiber array.

Further, another object of the present invention is to selectively mount one or more reflection mirrors on the respective ports of an optical fiber array, so that a structure in which one or more desired output optical waveguides can be selected from among a plurality of output optical waveguides which configure the output ports of a PLC device and can then be selectively monitored, is configured.

Further, another object of the present invention is to provide for the use one or more metal mirrors each capable of maintaining high reflectance in a wide wavelength band, and a structure and method capable of coupling a PLC device having various functions, thereby applying the metal mirrors, structure, and method to the PLC device having various functions.

In order to accomplish the above objects, the present invention provides a hybrid integrated structure of one or more optical active devices and a PLC device using an optical fiber array, in which one or more photodiodes are integrated on an upper cladding layer above one or more planar optical waveguides, wherein a section located on a boundary surface between output optical waveguides, that is, an end of the PLC device in the direction of propagation of light, and an input end of an output optical fiber array is ground to be inclined at a predetermined angle with respect to an optical axis; and one or more optical fibers and one or more reflection mirrors are alternately arranged, inserted, and disposed in a plurality of V-shaped trenches formed in the output optical fiber array.

Further, an optical signal from an output optical waveguide corresponding to the optical fiber, mounted in each of one or more of the plurality of V-shaped trenches, is transmitted to a rear end of the output optical fiber array without loss; and an optical signal from an output optical waveguide corresponding to the reflection mirror, mounted on each of one or more of the plurality of V-shaped trenches, is transmitted with high reflectance to the light reception region of the photodiode above the corresponding output optical waveguide.

Further, each of the reflection mirrors is processed after a metal wire, having a diameter similar to that of the optical fiber and having high reflectance, has been inserted thereinto.

Further, each of the reflection mirrors has a diameter in the range of 0.01 mm to 0.12 mm.

Further, in a hybrid integrated structure of one or more optical active devices and a PLC device using an optical fiber array, in which one or more photodiodes are integrated on an upper cladding layer above one or more planar optical waveguides, wherein a section located on a boundary surface between output optical waveguides, that is, an end of the PLC device in the direction of propagation of light, and an input end of an output optical fiber array is ground to be inclined at a predetermined angle with respect to an optical axis; one or more optical fibers are arranged, inserted, and disposed in one or more V-shaped trenches formed in the output optical fiber array; and one or more optical signals are reflected by forming one or more reflection mirrors using a method of using one or more reflection surfaces on a substrate itself, each of which is spaced apart from each of the V-shaped trenches at a predetermined interval, or a method of coating one or more metal surfaces, so that one or more optical signals from one or more of the plurality of output optical waveguides can be selected and reflected, thereby enabling the optical signals to be received in light reception regions of one or more photodiode devices.

Further, each of the reflection mirrors has a diameter in the range of 0.01 mm to 0.12 mm.

BRIEF DESCRIPTION OF THE DRAWINGS

The above and other objects, features and other advantages of the present invention will be more clearly understood from the following detailed description taken in conjunction with the accompanying drawings, that illustrate various preferred embodiments of the invention.

DETAILED DESCRIPTION OF THE PREFERRED EMBODIMENTS

Figure 1:
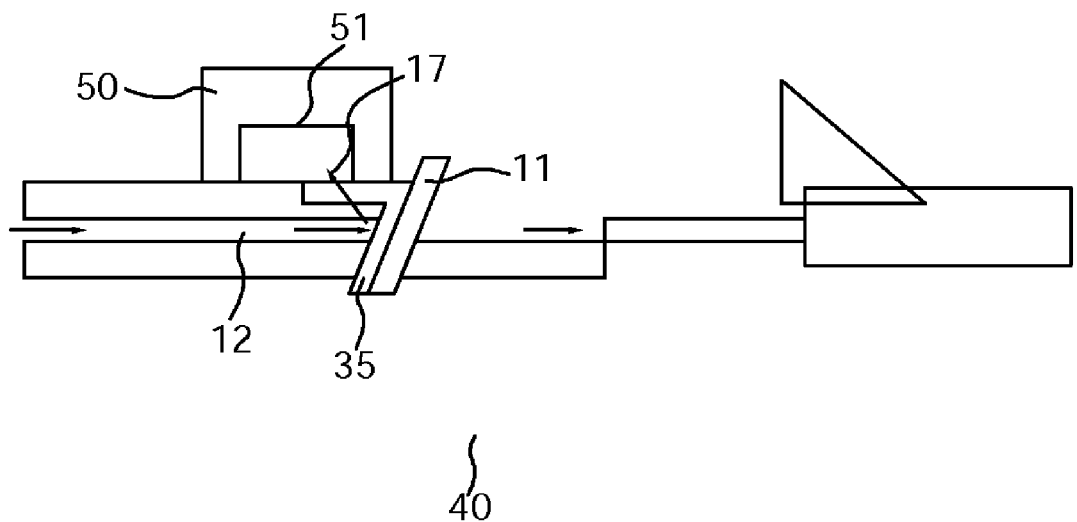
FIGS. 1 and 2 are cross-sectional views showing the configuration of a PLC device in which a trench is carved so as to mount a reflection mirror according to the prior art.
Figure 2:
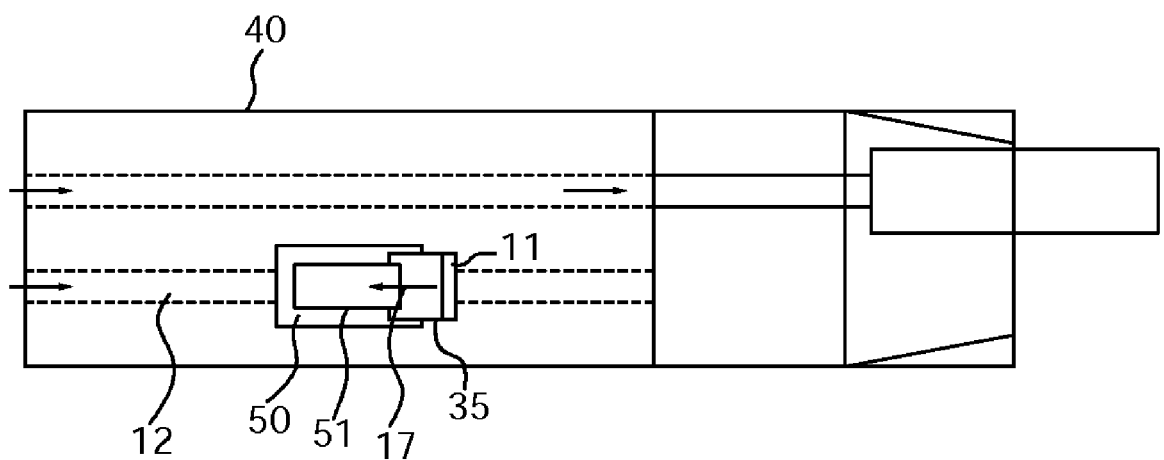
Figure 3:
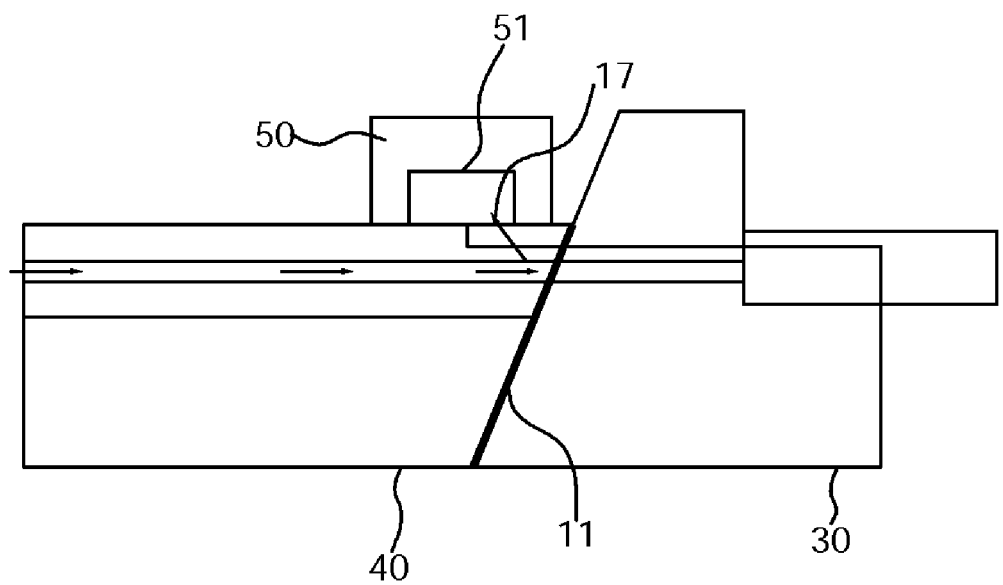
FIGS. 3 and 4 are a cross-sectional view and a planar view showing other prior art disclosing a configuration in which an output end of the PLC device is ground to be inclined, and the ground surface thereof is used without change, or a multi-layered thin film filter is inserted/attached, so that reflection and transmission simultaneously occur.
Figure 4:
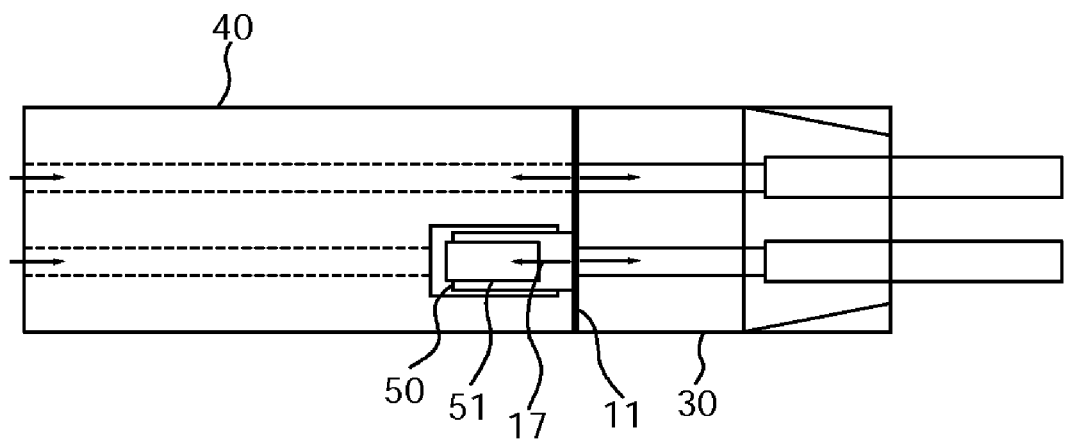

The structure of a PLC device module according to various embodiments of the present invention includes one or more optical fibers 100, an input optical fiber array 200 for transmitting optical signals passing through the optical fibers to a PLC device, the PLC device 400, one or more photodiode devices 500, and an output optical fiber array 300 for transmitting signals, output from the PLC device 400, to one or more optical fibers again.

In order to input an optical signal, transmitted through one of the optical fibers, to the PLC device 400, the input optical fiber array 200 has a structure in which one or more V-shaped trenches 330 are carved in a substrate 320 and one or more the optical fibers 100 are aligned and then mounted such that the optical fibers and the input optical waveguides of the PLC device can be easily aligned and bonded. The optical signal, transmitted from the input optical fiber array 200, passes through the PLC device 400 including a plurality of planar optical waveguides.

The PLC device 400 includes a substrate 150, and a core 120 and cladding layers 130 and 140, which are formed on the upper surface of the substrate. The PLC device 400 has a structure in which one or more predetermined guide grooves, used to package the photodiode devices 500, and one or more refractive index matching resin layers 610 capable of transmitting light, reflected from one or more planar optical waveguides, to one or more photodiode reception regions 510 without reflection loss, are formed. Further, one or more optical signals are guided through the optical waveguides based on a total reflection principle according to the difference in refractive indexes between the core 120 and the upper and lower cladding layers 130 and 140.

Preferably, the PLC device 400 includes one or more input optical waveguides, configured with planar optical waveguides, and configured to receive optical signals from the input optical fiber array, a part configured to perform the functions of an AWG device, a variable optical attenuator and an optical power splitter, and one or more output optical waveguides configured to transmit optical signals to the output optical fiber array. The above-described structure can be applied to the plurality of output optical waveguides connected to the output end of the PLC device 400.

The AWG, configured in the PLC device 400 using the planar optical waveguides, performs a function of branching off optical signals, configured with a plurality of wavelengths and simultaneously input through a single input optical waveguide, and then transmitting optical signals, each of which is configured to have a single wavelength, to the output optical waveguides corresponding to the respective wavelengths.

The variable optical attenuator, configured in the PLC device 400 using the planar optical waveguides, performs a function of attenuating the power of optical signals input through a plurality of input optical waveguides and then transmitting the attenuated optical signals to output optical waveguides corresponding to the respective input optical wavelengths.

The optical power splitter, configured in the PLC device 400 using the planar optical waveguides, performs a function of uniformly or differentially dividing the power of optical signals input through a single input optical waveguide, and then transmitting the resulting optical signals to arbitrary output optical waveguides.

The photodiode devices 500 are mounted using guide grooves previously formed in the PLC device 400, and it is preferred that photodiode devices 500 be separately mounted on the respective output optical waveguides or that they be mounted all at one time using a photodiode array.

Further, in the output optical fiber array 300, it is preferred that an integrated optical module be manufactured by mounting one or more optical fibers 100 and/or one or more metal wires 110 each functioning as a reflection mirror on respective V-shaped trenches 330 formed in the substrate 320, and aligning the centers of the output optical waveguides of the PLC device 400, optical fibers 100, and metal wires 110 each functioning as a reflection mirror, and connecting them using epoxy.

Meanwhile, each of the optical fibers 100 in the output optical fiber array 300 includes a core 120 and cladding layers 130 and 140, the section of the input surface of the output optical fiber array 300 is ground to be inclined at a predetermined angle with respect to an optical axis, and the optical fiber 100 enables an optical signal emitted from one of the output optical waveguides, the center of which is aligned with the optical fiber 100, to flow and reach the other end of the optical fiber.

Meanwhile, in the output optical fiber array 300, the section of the input surface of the output optical fiber array 300, in which the metal wires 110 each functioning as a reflection mirror are disposed, is ground to be inclined at a predetermined angle with respect to an optical axis, and almost of the optical signals, emitted from one or more output optical waveguides, the centers of which are aligned with the centers of the metal wires 110 each functioning as a reflection mirror, are reflected and enabled to reach the reception regions 510 of one or more photodiodes mounted on the output optical waveguides.

Further, in the output optical fiber array 300, it is preferred that an integrated optical device be manufactured by arranging one or more optical fibers 100 and/or one or more metal wires 110 each functioning as a reflection mirror in the one or more V-shaped trenches 330 formed in the substrate 320, and attaching them using a cover and epoxy.

In this case, preferably, the material of the substrate 320 includes quartz, heat resistant glass, and silicon. Further, a structure is configured such that the V-shaped trenches 330 are generated and then processed in the substrate 320, the optical fibers 100 and/or the metal wires 110 each functioning as a reflection mirror are inserted, and then they are aligned/bonded/ground. The output optical fiber array 300, provided as described above, is manufactured such that one or more reflection mirrors 111 and one or more optical fibers 100 can be selected and then aligned by selecting one or more output optical waveguides of the PLC device 400 to be coupled.

Hereinafter, in the structure of the PLC device 400 having the above-described configuration, various embodiments based on the operation thereof will be described with reference to the accompanying drawings.

Figure 5:
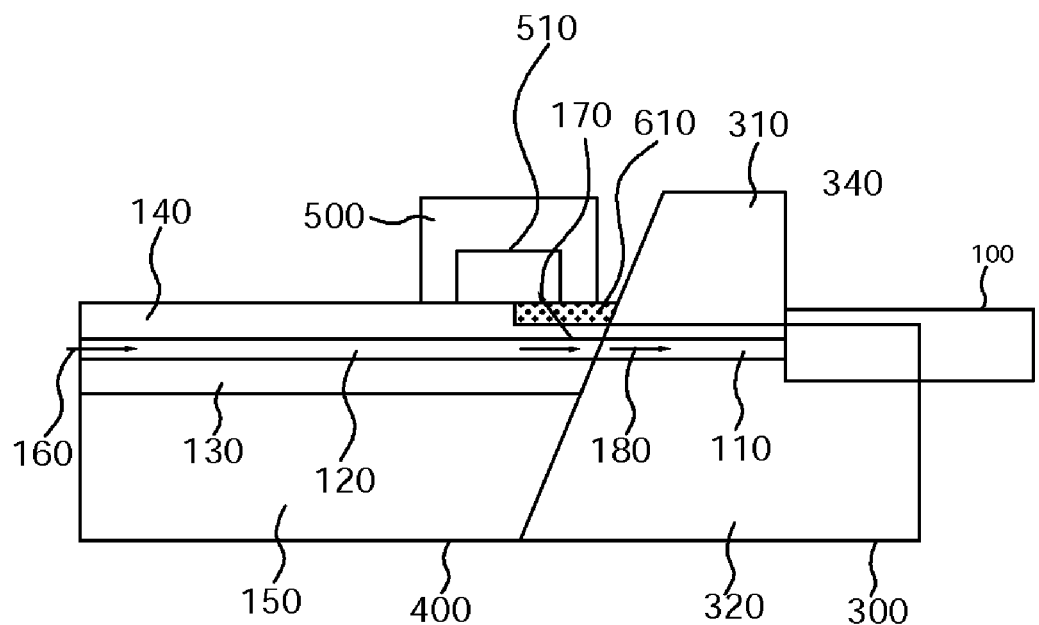
FIGS. 5 and 6 are a cross-sectional view and a planar view showing the configuration of a PLC device that includes one or more planar optical waveguides, each having no trench used to reflect an optical signal, according to the present invention.
Figure 6:
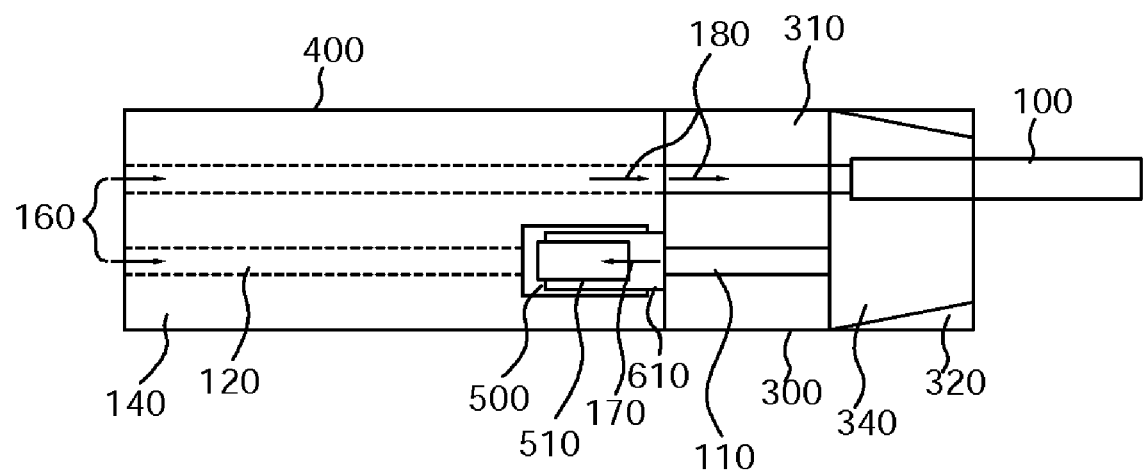

First, the structure of the PLC device 400 and the structure of the output optical fiber array 300, configured by being arranged with an end of the PLC device 400, according to various embodiments the present invention, will be described with reference to FIGS. 5 and 6.

In the structure of one or more planar optical waveguides which configure the PLC device 400, that is, in the structure configured with an upper cladding layer 140, a lower cladding layer 130, and a core 120, which are formed on the upper surface of the substrate 150, one or more input optical signals 160 generally flow through the core 120, and the input optical signals 160 are reflected by one or more metal reflection mirrors, formed by processing one or more metal wires 110 in the output optical fiber array 300, at an oblique boundary surface between one or more output optical waveguides of the PLC device 400 and the output optical fiber array 300.

One or more optical signals 170, which are reflected, deviate from the optical axes of the input optical signals 160 due to the metal reflection mirrors, each placed at an incline with respect to an optical axes, and then reflected to the upper cladding layers 140 of one or more planar optical waveguides. Therefore, the reflected optical signals 170 reach the upper cladding layer 140, and are then incident on the light reception regions 510 of one or more photodiode devices 500, each of which is an optical active device and which are spaced apart from the boundary surface.

In this case, it is preferred that each of the photodiode devices 500 allow the center of each of the light reception regions 510 to be aligned with the center of the core 120. Further, in order to decrease the reflection or dispersion of the reflected optical signals 170, it is preferred that an air layer between the light reception region 510 of the photodiode device 500 and the upper cladding layer 140 be removed and that a refractive index matching resin layer 610 be formed.

One or more input optical signals 160, which flow through the core 120 of one or more output optical waveguides, aligned with one or more optical fibers 100 other than the reflection mirrors 111 of the output optical fiber array 300, from among a plurality of output optical waveguides of the PLC device 400, are transmitted to one or more optical fibers 100 which are placed in the output optical fiber array 300 without loss at the oblique boundary surface between one or more output optical waveguides of the PLC device 400 and the output optical fiber array 300.

At the boundary surface, it is preferred that the output optical waveguides be accurately aligned with the centers of the respective optical fibers in the output optical fiber array 300, and that attachment be performed using epoxy 340 without an air layer on the boundary surface. Further, a cover 310 is provided on the upper surface of the epoxy 340.

Selectively, the output optical fiber array 300 having one or more metal wires 110 each functioning as a reflection mirror enables optical signals 160, transmitted from one or more output optical waveguides of the PLC device 400 aligned with one or more reflection mirrors 111, to be reflected at a predetermined angle, and then to be incident on one or more light reception regions 510 of the photodiodes 500 attached on the cladding layer 140 of one or more optical waveguides.

Further, one or more optical signals 160, transmitted from one or more output optical waveguides of the PLC device aligned with one or more optical fibers 100 other than the metal wires 110 each functioning as a reflection mirror in the output optical fiber array 300, penetrate through the optical fibers 100, and are then transmitted to another device at an rear end. For this purpose, one or more optical fibers 100 and one or more metal wires 110, each functioning as a reflection mirror, are alternatively disposed on the substrate 320, having one or more V-shaped trenches 320, of the output optical fiber array 300, so that the desired number of reflection mirrors 111 and optical fibers 100 can be aligned with the output optical waveguides of the PLC device 400.

First Embodiment

Figure 7:
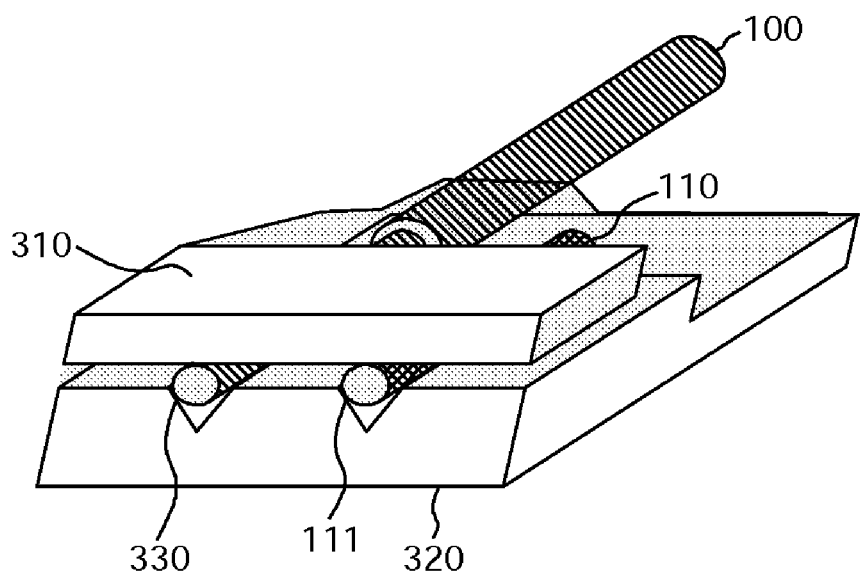
FIG. 7 is a perspective view showing the configuration of an output optical fiber array for reflecting an optical signal at a boundary surface between one or more output optical waveguides and the output optical fiber array according to an embodiment of the present invention.
Figure 8:
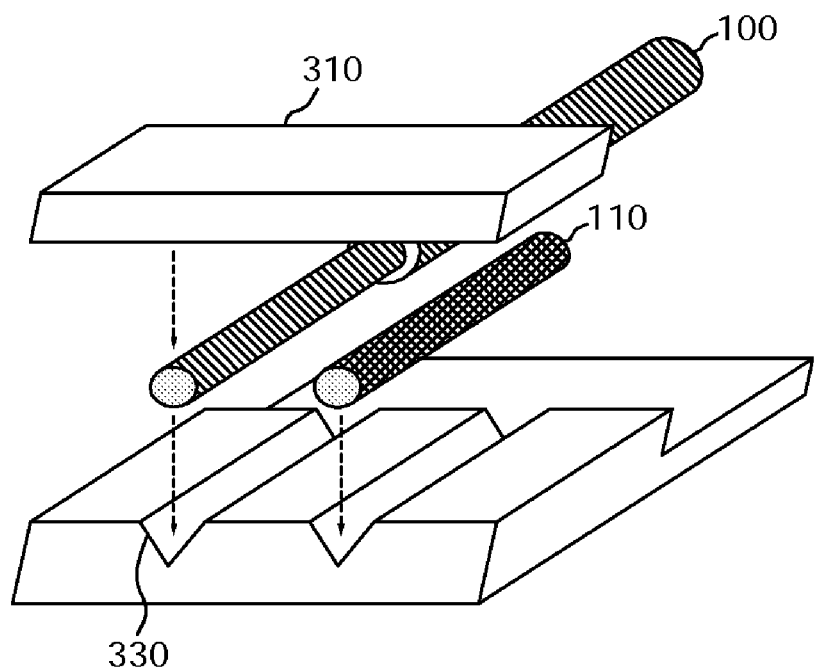
FIG. 8 is an exploded assembly view showing the configuration of the output optical fiber array of FIG. 7.
Figure 9:
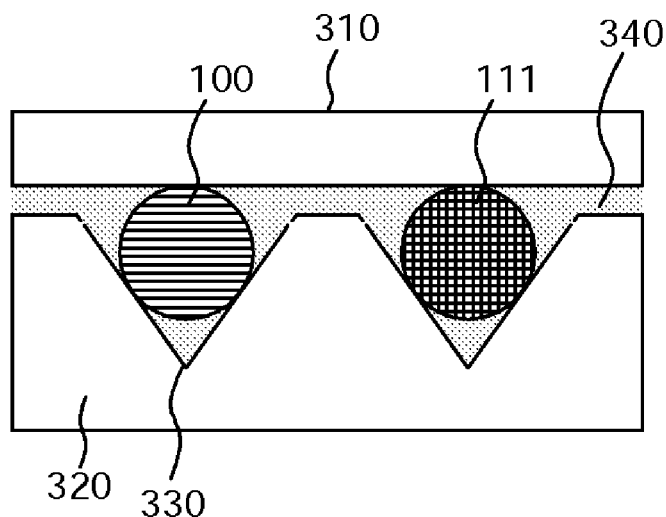
FIG. 9 is a side view showing the configuration of the output optical fiber array of FIG. 7.

FIGS. 7 to 9 show a first embodiment of the present invention.

The configuration of the output optical fiber array 300, provided in an embodiment of the present invention and configured to selectively include one or more reflection mirrors, is described below. As shown in the drawings, the output optical fiber array 300 includes a substrate 320 having one or more V-shaped trenches 330, which are used to accurately arrange one or more optical fibers 100 spaced apart from each other at a desired interval, one or more optical fibers 100 aligned on the substrate 320, one or more metal wires 110 to be processed as reflection mirrors, and an epoxy 340 and a cover 310 configured to fix the optical fibers 100 and the metal wires 110.

In this case, the substrate 320 is configured such that the V-shaped trenches 330 are processed in a substrate formed of quartz, heat resistant glass, or silicon, and then an optical fiber is aligned, bonded, and ground.

Further, each of the optical fibers 100 and metal mirrors 111 is determined to have a predetermined ratio and a location if necessary. For this purpose, the optical fiber 100 and the metal wire, which functions as a reflection mirror and is adjacent to the optical fiber, are mounted in respective V-shaped trenches, which have been accurately manufactured, and are always spaced apart from each other at a predetermined interval, and the surfaces thereof to be coupled to one or more output optical waveguides of the PLC device 400 are ground. The ground optical fiber 100 has high transmittance without dispersion loss, and the ground metal wire functioning as a reflection mirror becomes a metal reflection mirror 111 and has high reflectance.

Here, the ground surface of the output optical fiber array 300 has a predetermined angle with respect to a vertical line. When the predetermined angle is adjusted, the paths, through which one or more optical signals reflected by one or more reflection mirrors 111 flow, can be adjusted, so that the locations of the light reception regions of one or more photodiode device 500 can be determined.

Here, the diameter of each of the metal reflection mirrors 111 is approximately 0.1 mm, the diameter of each of the output optical waveguides is 0.01 mm or less, and an arrangement error between the center of the output optical waveguide of the PLC device 40 and the center of the corresponding optical fiber of the output optical fiber array 300 is generally ±0.0005 mm, and thus the entire optical signal, output from the output optical waveguide, can be reflected.

Second Embodiment

Figure 10:
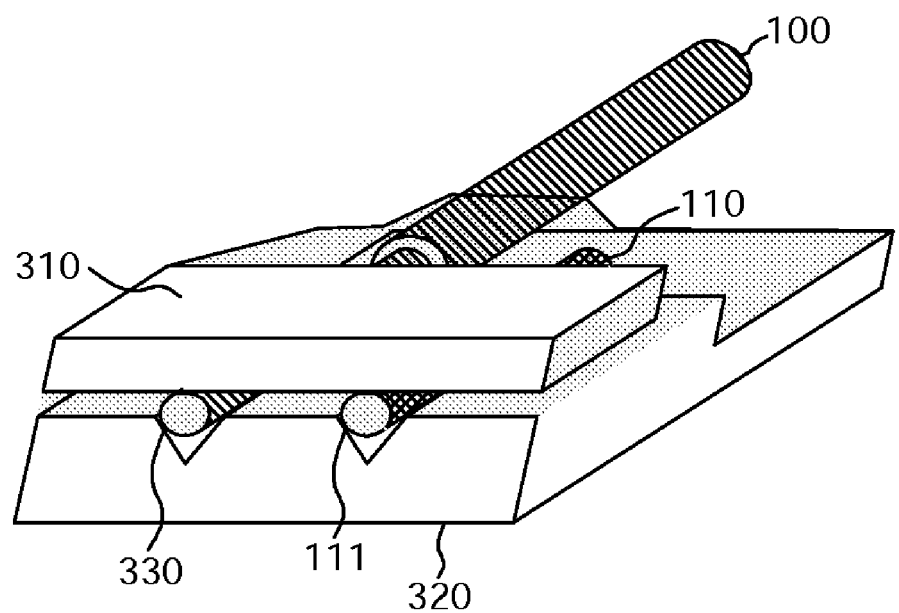
FIG. 10 is a perspective view showing the configuration of another output optical fiber array for reflecting an optical signal at a boundary surface between one or more output optical waveguides and the output optical fiber array according to an embodiment of the present invention.
Figure 11:
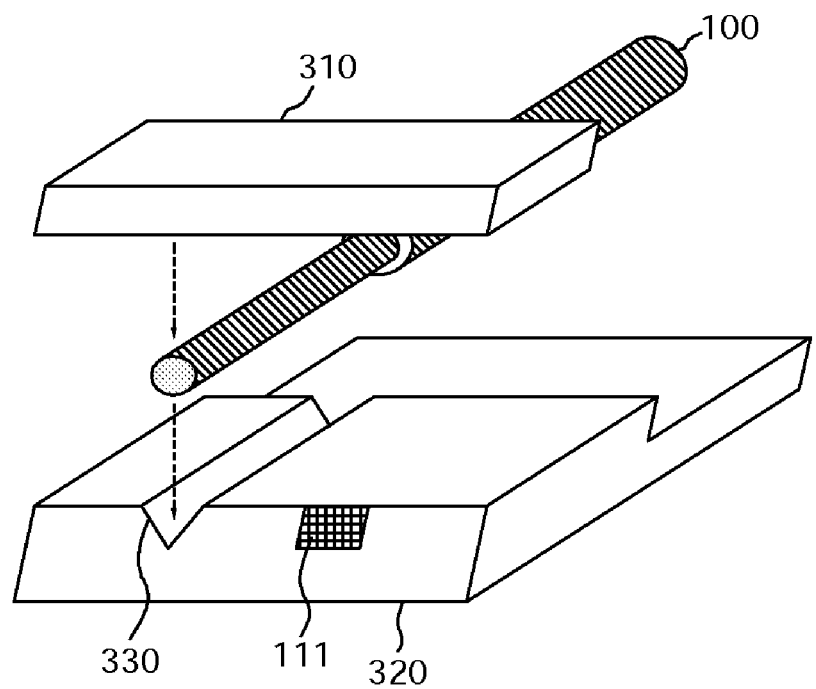
FIG. 11 is an exploded assembly view showing the configuration of the output optical fiber array of FIG. 10.
Figure 12:
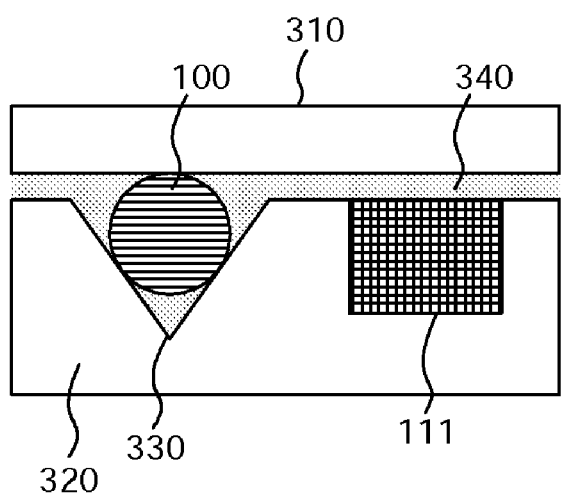
FIG. 12 is a side view showing the configuration of the input surface of the output optical fiber array of FIG. 10.

FIGS. 10 to 12 show a second embodiment of the present invention.

As shown in the drawings, it is characteristic that the V-shaped trenches 330 and the metal wires are not used to reflect the optical signals 160 reflected from the output optical waveguides of the PLC device 500, but reflection mirrors 111, which use the surfaces of the substrate 320 of the output optical fiber array 300 as it is, are provided. Here, it is preferred that each of the reflection mirrors 111 having high reflectance be formed by coating each of metal surfaces at spots on the substrate 320 which are expected to reflect optical signals.

FIG. 10 does not show a structure in which one or more optical signals received from some of the output optical waveguides of the PLC device are transmitted to the rear end of the output optical fiber array through one or more optical fibers 100 on the respective V-shaped trenches 330 formed in the substrate 320 of the output optical fiber array, and in which one or more metal wires are inserted into the respective V-shaped trenches 330 of the output optical fiber array so that one or more optical signals transmitted from the some of the output optical waveguides are reflected and can then be received by one or more photodiode devices, but rather FIG. 10 shows a structure in which each of the reflection mirrors 111 is formed on the section while the reflection mirror 111 is inclined at a predetermined angle with respect to a vertical axis. Further, a piece of epoxy 340 and a cover 310 are configured above each of the optical fibers and reflection mirrors so as to fix each of the optical fibers and reflection mirrors after they are mounted and formed.

In this case, the substrate 320 is configured such that V-shaped trenches 330 are processed in the substrate formed of quartz, heat resistant glass, and silicon, and then each of the optical fibers 100 is arranged, bonded, and ground, as shown in FIG. 11. Of course, with regard to the material of the substrate 320, it is preferred that material the reflectance of which is very different from the material of the optical waveguide be used so as to obtain high reflectance.

As shown in FIG. 12, each of the optical fibers 100 and metal mirrors 111 is determined to have a predetermined ratio and a location if necessary, and the optical fibers 100 which are adjacent to each other are mounted in respective V-shaped trenches, which have been accurately manufactured, so that they are always spaced apart from each other at a predetermined interval. Each of the surfaces of the optical fibers to be coupled to the respective output optical waveguides of the PLC device 400 is ground. Each of the ground optical fibers 100 has high transmittance without dispersion loss, and each of the ground or metal material coated metal reflection mirrors 111 has high reflectance. The ground surface of the output optical fiber array has a predetermined angle with respect to a vertical line, and paths, through which one or more optical signals reflected by one or more reflection mirrors 111 flow, can be adjusted by adjusting the predetermined angle, so that the locations of the light reception regions of the respective photodiode devices can be determined.

Here, the diameter of each of the metal reflection mirrors 111 is approximately 0.25 mm, the diameter of each of the output optical waveguides is 0.01 mm or less, and an arrangement error between the center of the output optical waveguide of the PLC device and the center of the corresponding optical fiber of the output optical fiber array is generally +/−0.0005 mm, and thus the entire optical signal, output from the output optical waveguide, can be reflected.

Meanwhile, when the structure of the output optical fiber array 300 is used, a tap coupler 710 capable of branching off the power of an optical signal at a predetermined rate is coupled to a photodiode device 500 on the upper cladding layer of the tap coupler 710 using the output optical fiber array 300, the tap coupler 710 and the photodiode device 500 being implemented in the PLC device 400, so that the prior art structure, which is capable of switching an optical signal into an electric signal by monitoring the power of the optical signal, can be implemented.

Third Embodiment

Figure 13:
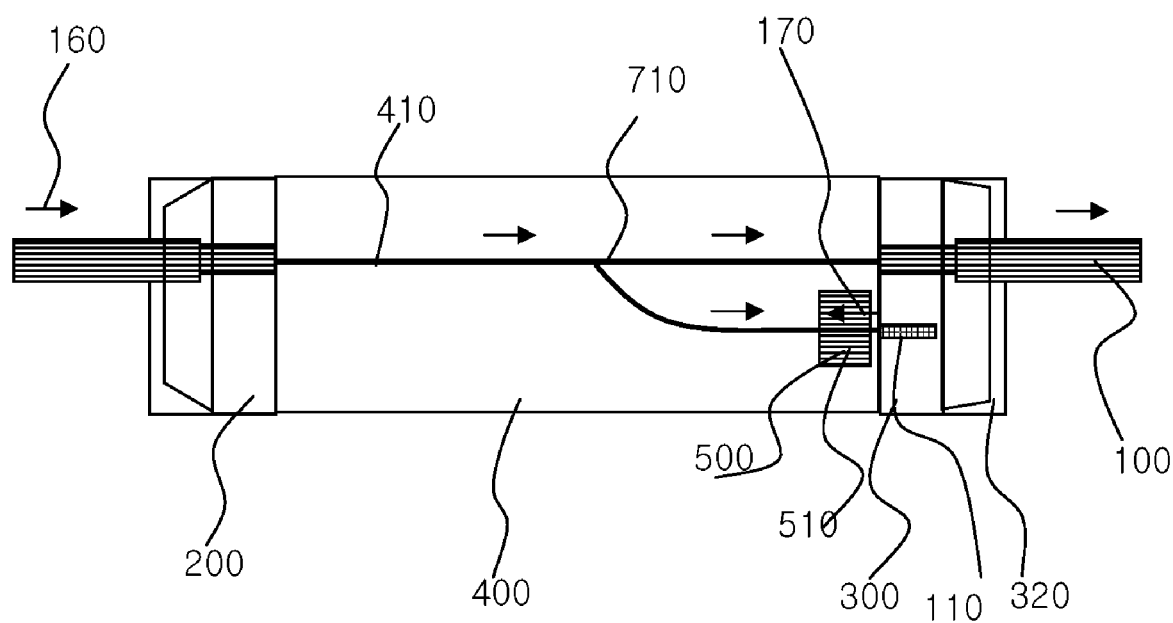
FIG. 13 is a top view showing that a PLC device is coupled to a photodiode so as to monitor an optical signal in a single port configuration.
Figure 14:
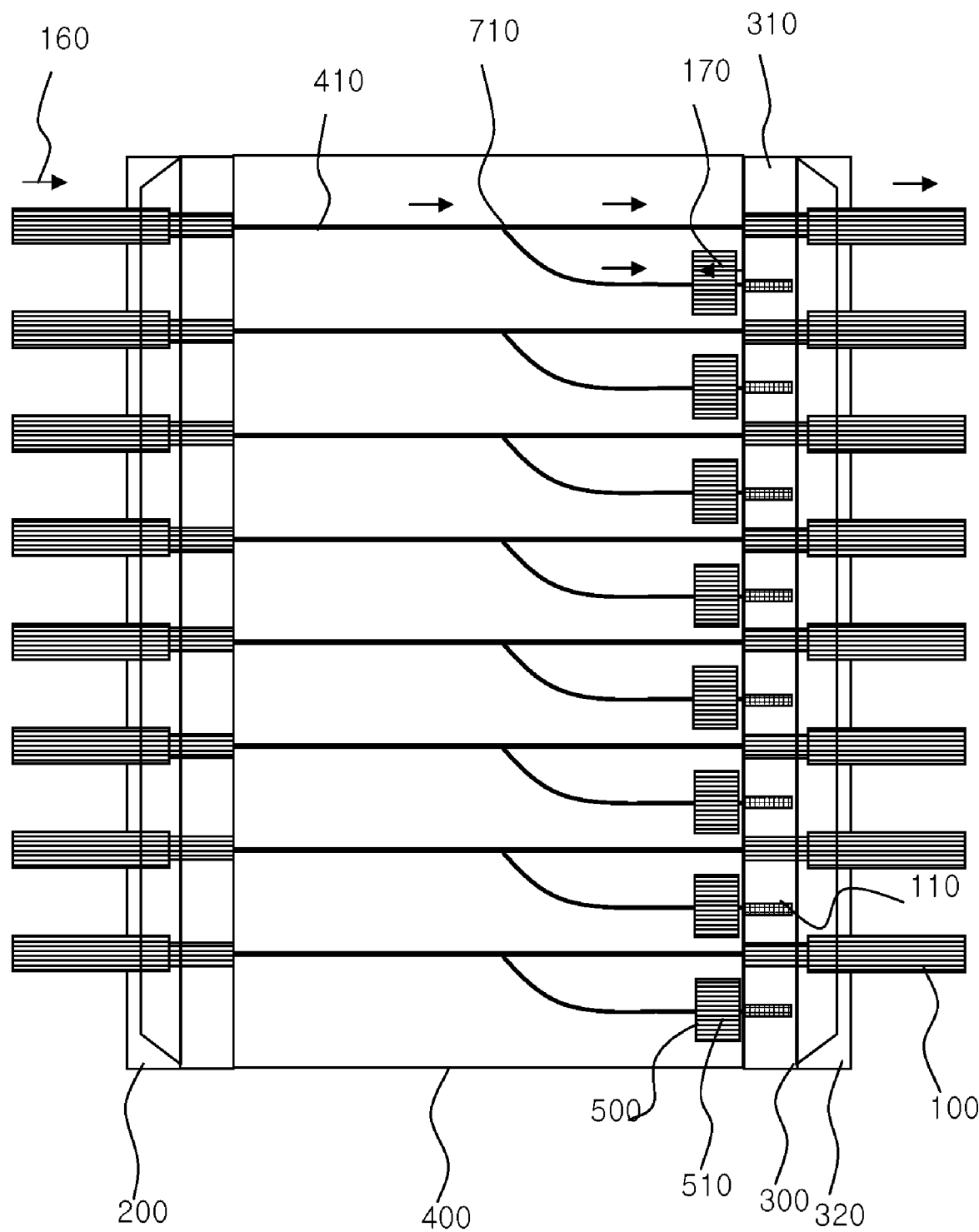
FIG. 14 is a top view showing that a PLC device is coupled to one or more photodiodes so as to monitor one or more optical signals in a multi-port configuration.

FIGS. 13 to 14 are views showing a third embodiment of the present invention, and showing an example in which a PLC device 400 having one or more tap couplers 710 are coupled to one or more photodiode devices 500 using an output optical fiber array 300.

As shown in FIG. 13, in the PLC device module, an optical fiber aligned through an input optical fiber array 200 is connected to the input optical waveguide of the PLC device, the tap coupler 710 is implemented using a planar optical waveguide, and the output optical waveguide is connected to the optical fiber 100 through the output optical fiber array 300.

Meanwhile, in the upper cladding layer of the planar optical waveguide, the center of the light reception region 510 of the photodiode device 500 and the center of the core of the planar optical waveguide are aligned and then placed. In this case, the light reception region 510 of the photodiode device 500 is placed on a location spaced appropriately apart from the boundary surface between the output optical fiber array 300 and the PLC device 400 so as to receive a reflected optical signal 170.

With regard to a process of transmitting an optical signal, first, the optical signal 160, transmitted through the input optical fiber array 200, flows along the planar optical waveguide. When one or more optical signals passing through the tap coupler 710, the optical signals flowing through the planar optical waveguide 410 branches into an output optical waveguide, which transmits 95% of the optical signals, and an output optical waveguide, which transmits 5% of the optical signals. Here, an optical fiber is disposed on a trench corresponding to the output optical waveguide, which transmits 95% of the optical signals, of a two port output optical fiber array 300, the trench being included in the substrate 320. A metal wire 110 functioning as a reflection mirror is disposed on a V-shaped trench corresponding to the output optical waveguide, which transmits 5% of the optical signals, of a two port output optical fiber array 300.

Therefore, 5% of the optical signals are reflected and then received by the light reception regions 510 of the respective photodiode devices, and the remaining 95% of the optical signals are transmitted to the rear end as output light 180 through the optical fibers 100.

Sequentially, each of the photodiodes 500, which received the reflected optical signal, switches the optical signal into an electric signal corresponding to the power of the optical signal and then transmits the electric signal outside through one of the connected metal wires.

FIG. 14 shows an example which can be implemented using the integrated structure provided above, that is, shows the combination of a PLC device 400, in which the above-described tap coupler 710 is expanded into a multi-port array structure, and one or more photodiodes 510. It can be seen from the drawing that application is possible regardless of the number of input/output ports. Since the structure and process of transmitting an optical signal are the same as in FIG. 13, a detailed description thereof is omitted.

Through the structure provided herein, it can be known that a photodiode can be coupled to another PLC device as well as the above-described tap coupler 710. For example, a PLC device which performs various functions with various input/output ports, that is, almost all types of PLC devices, such as an AWG device, a variable optical attenuator, an optical switch and an optical power splitter, can switch some or all of the optical signals, flowing through the planar optical waveguides of the PLC device, into electric signals.

Fourth Embodiment

Figure 15:
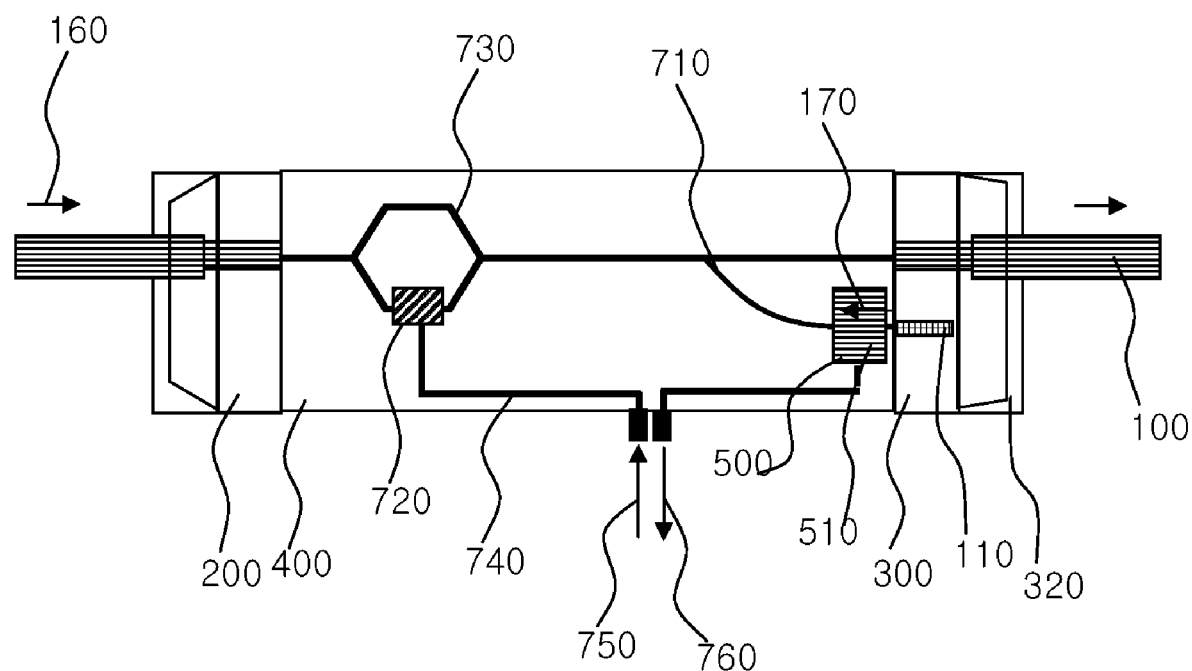
FIG. 15 is top view showing a coupling structure in order to monitor an optical signal output form a variable optical attenuator and control the power of the output optical signal.
Figure 16:
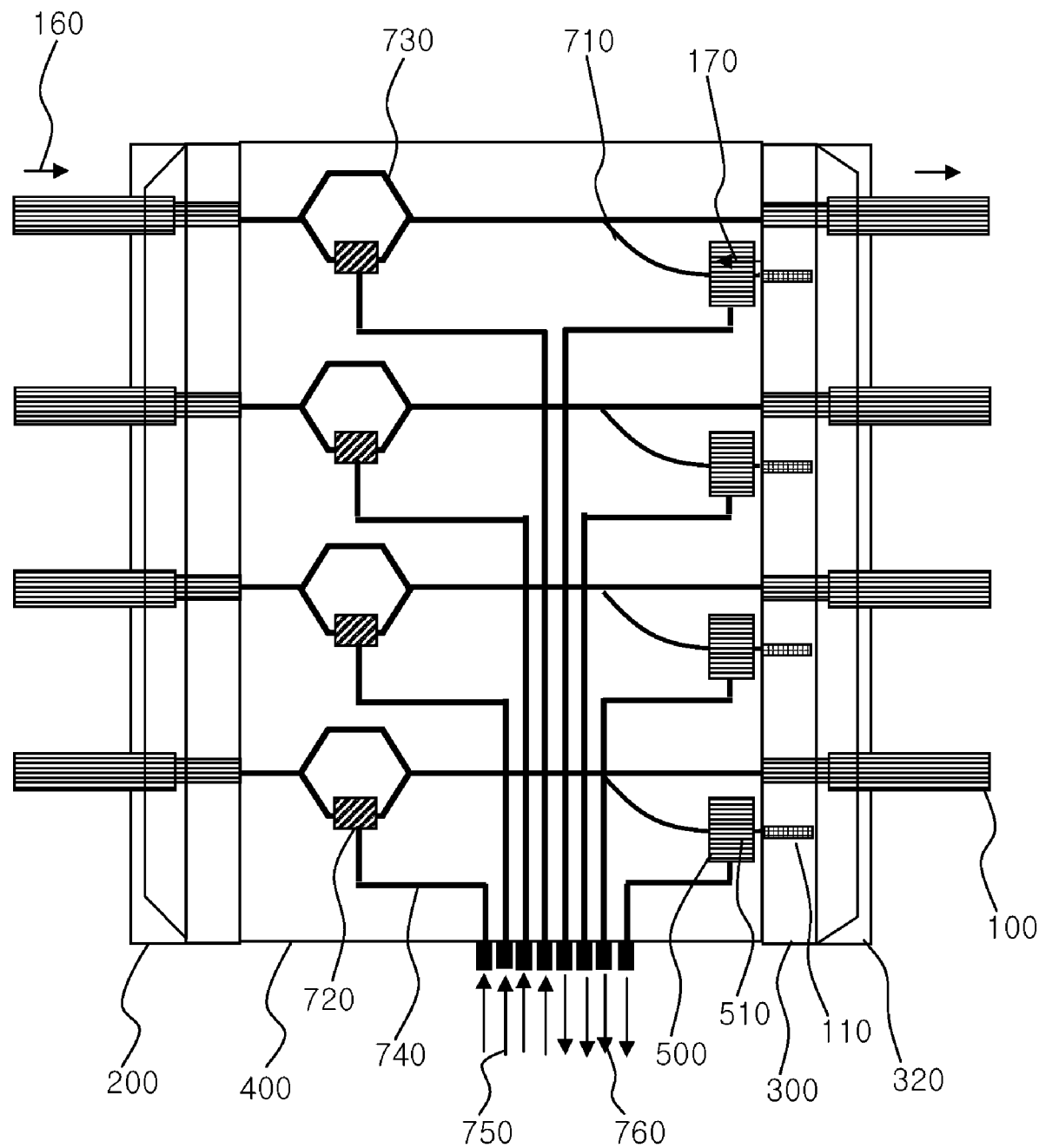
FIG. 16 is a top view showing a coupling structure in order to monitor one or more optical signals output from a multi-port variable optical attenuator and control the power of the respective output optical signals.

FIGS. 15 and 16 are views showing a fourth embodiment of the present invention.

FIG. 15 shows an example which can be implemented using the integrated structure provided herein, and shows the combination of a PLC device 400, in which a variable optical attenuator and a tap coupler 710 are simultaneously implemented, and the photodiode 510.

As shown in the drawing, the power of the optical signal transmitted to the tap coupler 710 is attenuated because of additive/destructive interference attributable to the difference in paths between optical signals divided when an optical signal, input to the input optical waveguide of the PLC device 400 through the input optical fiber array 200, passes through a Mach-Zehnder 730, implemented by a planar optical waveguide and a heater 720. Here, the difference in paths between optical signals becomes large depending on the size of the electric signal applied to the heater 720.

As described above, the 95% of the optical signals of the tap coupler 710 pass through the optical fiber 100 of the output optical fiber array 300, and the remaining 5%, which have been branched off, are received by the photodiode 500 attributable to the metal reflection mirror 111 of the output optical fiber array 300.

Therefore, in consideration of the power of an electric signal 750, transmitted along a metal strip line 740 in the photodiode 500 and then output outside, and the branch ratio of the tap coupler 710, the power of light attenuated in an external electric circuit is calculated, and the attenuation ratio of a variable optical attenuator is adjusted by applying the electric signal 750 in order to attenuate the power of light as much as desired. This operation is possible in the multi-port variable optical attenuator array, as shown in FIG. 16.

With an optical waveguide structure as described herein, the following effects can be obtained.

First, it is not necessary to process one or more accurate trenches in one or more planar optical waveguides, and to mount one or more reflection mirrors, which are difficult to handle, in order to reflect one or more optical signals which flow through the respective planar optical waveguides and then to receive them by one or more photodiodes.

Second, light flowing through one or more optical waveguides is received by one or more photodiodes using an optical fiber array and an alignment process, which are essential in order to package a PLC device, so that an additional process of processing the optical waveguides is not required to be performed.

Third, with regard to a method of mounting one or more reflection mirrors in an optical fiber array, a method of substituting one or more metal wires for one or more optical fibers, the metal wires, each having a diameter similar to that of the optical fiber and a type identical to the optical fiber, is used, so that there is an advantage in that the structure can be implemented in an existing process of manufacturing an optical fiber array.

Fourth, one or more reflection mirrors are selectively mounted on the respective ports of an optical fiber array, so that one or more desired output optical waveguides can be selected from among a plurality of output optical waveguides which configure the output ports of a PLC device, and can then be selectively monitored.

Fifth, the use of one or more metal mirrors, capable of maintaining high reflectance in a wide wavelength band, and a structure and method capable of coupling a PLC device having various functions are proposed, so that a PLC device having various functions can be configured in a wavelength band.

As described above, while the present invention has been described using limited embodiments and with reference to the drawings, the present invention is not limited thereto. It will be understood by those skilled in the art that various changes and modifications may be made without departing from the technical spirit and scope of the present invention as defined in the following claims.

The present invention relates to a structure in which one or more planar optical waveguides are coupled to one or more photodiodes, each of which is an optical active device, in order to convert optical signals flowing along optical paths, which configure planar optical waveguide device at an end, into electric signals. Light flowing through one or more optical waveguides is received by one or more photodiodes using an optical fiber array and alignment process, which are essential in order to package a PLC device, so that an additional process of processing the optical waveguides is not required to be performed. Therefore, a large substitution effect can be obtained in a process and cost, and thus the structure according to the present invention is expected to be applicable to a plurality types of optical communication devices.

The present invention may be described in terms of functional block components and various processing steps. Such functional blocks may be realized by any number of components configured to perform the specified functions. For example, the present invention may employ various integrated circuit components which may carry out a variety of functions under the control of one or more microprocessors or other control devices. Furthermore, the present invention could employ any number of conventional techniques for electronics configuration and the like. For the sake of brevity, conventional components and aspects may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". The word mechanism is intended to be used generally and is not limited solely to mechanical embodiments. Numerous modifications and adaptations will be readily apparent to those skilled in this art without departing from the spirit and scope of the present invention.

TABLE OF REFERENCE CHARACTERS

Description of principal elements in the drawings:
100 optical fiber
110 metal wire for reflection mirror
111 reflection mirror
120 core
130 lower cladding layer
140 upper cladding layer
150 substrate
160 input light
170 reflected light
180 output light
190 planar optical waveguide
200 input optical fiber array
300 output optical fiber array
310 cover
320 substrate having V-shaped trench
330 V-shaped trench
340 Epoxy
400 PLC device
410 planar optical waveguide
500 photodiode device
510 photodiode reception region
610 resin
710 tap coupler
720 heater
730 Mach-Zehnder
740 metal strip line
750 input electric signal
760 output electric signal

What is claimed is:
1. A hybrid integrated structure, comprising:
an output optical fiber array, comprising:
a substrate;
a plurality of V-shaped trenches formed in the substrate;
one or more optical fibers and one or more reflection mirrors that are alternately arranged, inserted, and disposed in the plurality of V-shaped trenches;

the structure further comprising:
a Planar Lightwave Circuit (PLC) device using an optical fiber array, the PLC comprising:
one or more planar optical waveguides;
an upper cladding layer;
one or more photodiodes integrated on the upper cladding layer above the one or more planar optical waveguides;
the structure further comprising:
a section located on a boundary surface between: a) output optical waveguides which is at an end of the PLC device in a direction of propagation of light, and b) an input end of an output optical fiber array, the section being ground at a predetermined inclined angle with respect to an optical axis.

2. The hybrid integrated structure as set forth in claim 1, comprising:
an output optical waveguide corresponding to the optical fiber, mounted in each of one or more of the plurality of V-shaped trenches, via which an optical signal is transmitted to a rear end of the output optical fiber array without loss; and
an output optical waveguide corresponding to the reflection mirror, mounted on each of one or more of the plurality of V-shaped trenches, via which an optical signal is transmitted at high reflectance to a light reception region of the photodiode above the corresponding output optical waveguide.

3. The hybrid integrated structure as set forth in claim 1, wherein each of the reflection mirrors that are processed after a metal wire, have a diameter similar to that of the optical fiber and having high reflectance, has been inserted thereinto.

4. The hybrid integrated structure as set forth in claim 1, wherein each of the reflection mirrors has a diameter in a range of 0.01 mm to 0.12 mm.

5. The hybrid integrated structure as set forth in claim 3, wherein each of the reflection mirrors has a diameter in a range of 0.01 mm to 0.12 mm.

6. The hybrid integrated structure as set forth in claim 3, wherein an error tolerance between a center of the output optical waveguide of the PLC device and a center of a corresponding optical fiber of the output optical fiber array is generally +/−0.0005 mm.

7. The hybrid integrated structure as set forth in claim 1, further comprising epoxy and a cover above each of the optical fibers and reflection mirrors to fix each of the optical fibers and reflection mirrors.

8. The hybrid integrated structure as set forth in claim 1, wherein substrate material used is selected from the group consisting of quartz, heat resistance glass, and silicon.

9. The hybrid integrated structure as set forth in claim 1, further comprising a tap coupler that branches off power of an optical signal at a predetermined rate.

10. The hybrid integrated structure as set forth in claim 9, wherein the predetermined rate is approximately 5%.

11. The hybrid integrated structure as set forth in claim 9, wherein the tap coupler is coupled to a photodiode device on the upper cladding layer of the tap coupler using the output optical fiber array.

12. The hybrid integrated structure as set forth in claim 9, further comprising a device for switching an optical signal into an electrical signal by monitoring power of the optical signal via the tap coupler.

13. The hybrid integrated structure as set forth in claim 9, wherein the tap coupler is implemented using a planar optical waveguide, and the output optical waveguide is connected to the optical fiber through the output optical fiber array.

14. The hybrid integrated structure as set forth in claim 1, wherein a center of a light reception region of the photodiode device and a center of a core of the planar optical waveguide are aligned and placed in the upper cladding layer of the planar waveguide.

15. A hybrid integrated structure of one or more optical active devices and a PLC device using an optical fiber array, comprising:
one or more photodiodes integrated on an upper cladding layer above one or more planar optical waveguides;
a section located on a boundary surface between: a) output optical waveguides which is at an end of the PLC device in a direction of propagation of light, and b) an input end of an output optical fiber array, the section being ground to be inclined at a predetermined angle with respect to an optical axis;
one or more optical fibers arranged, inserted, and disposed in one or more V-shaped trenches formed in the output optical fiber array; and
one or more reflection mirrors to reflect one or more optical signals, the mirrors being formed: a) using one or more reflection surfaces on the substrate itself each of which is spaced apart from each of the V-shaped trenches at a predetermined interval, or b) using a coating of one or more metal surfaces, so that one or more optical signals from one or more of the plurality of output optical waveguides can be selected and reflected, thereby enabling the optical signals to be received in light reception regions of one or more photodiode devices;
wherein each of the reflection mirrors has a diameter in a range of 0.01 mm to 0.12 mm.

16. A hybrid integrated structure of one or more optical active devices and a PLC device using an optical fiber array, comprising:
one or more photodiodes integrated on an upper cladding layer above one or more planar optical waveguides;
a section located on a boundary surface between: a) output optical waveguides which is at an end of the PLC device in a direction of propagation of light, and b) an input end of an output optical fiber array, the section being ground to be inclined at a predetermined angle with respect to an optical axis;
one or more optical fibers arranged, inserted, and disposed in one or more V-shaped trenches formed in the output optical fiber array; and
one or more reflection mirrors to reflect one or more optical signals, the mirrors being formed: a) using one or more reflection surfaces on the substrate itself each of which is spaced apart from each of the V-shaped trenches at a predetermined interval, or b) using a coating of one or more metal surfaces, so that one or more optical signals from one or more of the plurality of output optical waveguides can be selected and reflected, thereby enabling the optical signals to be received in light reception regions of one or more photodiode devices;
wherein each of the reflection mirrors has a diameter of approximately 0.25 mm.

17. A method for manufacturing a hybrid integrated structure, comprising:
providing an output optical fiber array comprising a substrate;
producing a plurality of V-shaped trenches in the substrate;
providing one or more optical fibers and one or more reflection mirrors that are alternately arranged, inserted, and disposed in the plurality of V-shaped trenches;

grinding a section of the output optical fiber array located at a boundary surface at a predetermined inclined angle with respect to an optical axis;

providing a PLC device;

providing one or more planar optical waveguides on the PLC device;

providing an upper cladding layer on the PLC device;

arranging one or more photodiodes integrated on the upper cladding layer above the one or more planar optical waveguides;

providing a corresponding inclined angle at an end of the PLC device designed to mate with the inclined angle of the output optical fiber array; and joining the output optical fiber array and the PLC device so that their respective edges having an inclined angle mate.

18. A method for operating a hybrid integrated structure comprising an output optical fiber array, comprising a substrate, a plurality of V-shaped trenches formed in the substrate, one or more optical fibers and one or more reflection mirrors that are alternately arranged, inserted, and disposed in the plurality of V-shaped trenches, the structure fun her comprising a Planar Lightwave Circuit (PLC) device using an optical fiber array, the PLC comprising one or more planar optical waveguides, an upper cladding layer, one or more photodiodes integrated on the upper cladding layer above the one or more planar optical waveguides, the structure further comprising a section located on a boundary surface between: a) output optical waveguides which is at an end of the PLC device in a direction of propagation of light, and b) an input end of an output optical fiber array, the section being ground at a predetermined inclined angle with respect to an optical axis, the method comprising:

providing an input optical signal to the PLC device;

reflecting the optical signal from the reflection mirror of the output optical fiber array to the upper cladding;

providing the reflected optical signal to a planar optical waveguide; and conveying the optical signal via the planar optical waveguide to the photodiode.

* * * * *